G. I. Washburn,
Steam-Boiler Condenser.
N° 40,204. Patented Oct. 6, 1863.
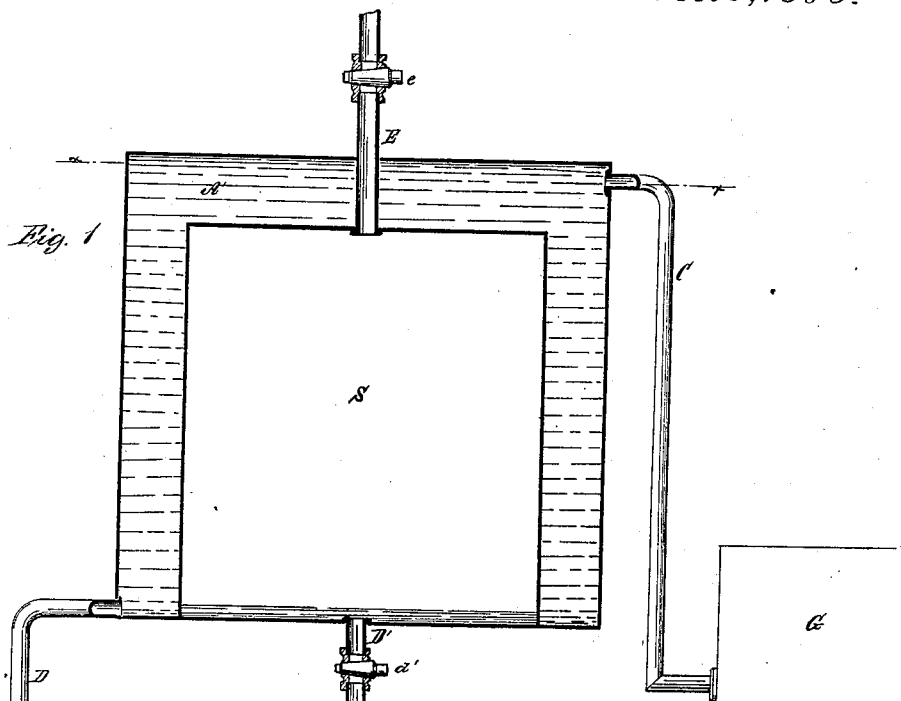
Fig. 1
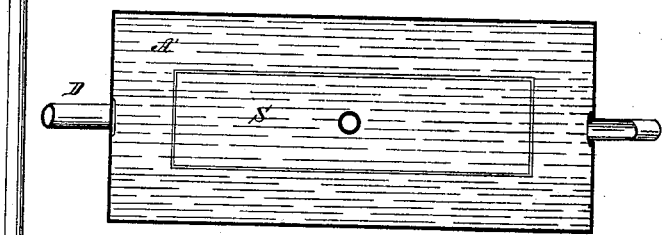
Fig. 2
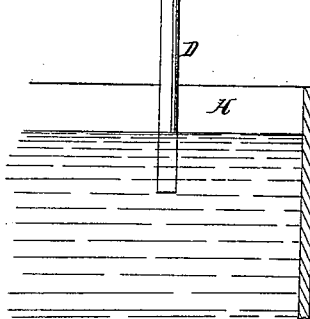
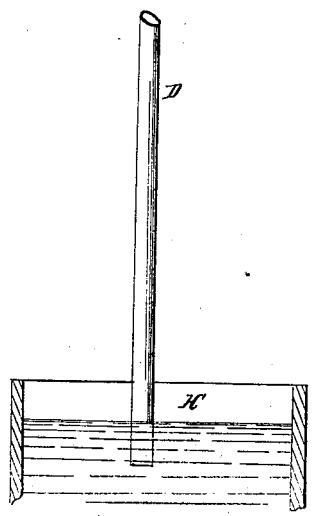

UNITED STATES PATENT OFFICE.

GEORGE I. WASHBURN, OF WORCESTER, MASSACHUSETTS.

IMPROVEMENT IN CONDENSERS FOR STEAM-ENGINES.

Specification forming part of Letters Patent No. 40,204, dated October 6, 1863.

*To all whom it may concern:*

Be it known that I, GEORGE I. WASHBURN, of the city and county of Worcester, in the State of Massachusetts, have invented certain new and useful Improvements in Condensers; and I do hereby declare the following to be a full and exact description of the same, reference being had to the accompanying drawings, making part of this specification, in which—

Figure 1 represents a vertical longitudinal section of a condensing apparatus illustrating my invention. Fig. 2 is a horizontal section of the same at x x, Fig. 1.

Similar letters of reference denote like parts of the apparatus in the several figures.

To enable others skilled in the art to which my invention appertains to fully understand and use the same, I will proceed to describe its construction and operation.

A represents a tank, inclosed on all of its sides, and provided with an inlet-pipe, C, and an outlet-pipe, D.

S represents an air-tight chamber, within which steam is to be condensed. E is the inlet-pipe for the steam, and D' the exit-pipe, through which water of condensation is drawn out. The said pipe D' terminates at its lower end in a reservoir, H', placed so far—say thirty-four feet—below the condensing-chamber S that a vacuum will be maintained in the latter by the weight of the descending column of water. The pipes D' and E may be guarded by stop-cocks d' e.

This condenser is designed to be used wherever it is desirable to produce a vacuum by condensing exhaust-steam from a steam-engine. It requires no pumps or valves, and can be applied to any ordinary stationary non-condensing engine, and thus unite or combine with such an engine the advantages of the small, cheap steam-engine in common use, with the economy of the twelve to fourteen pounds per square inch more pressure upon the piston for the given boiler-pressure of the condensing-engine.

The operation of the condenser is as follows: Suppose the pipe C to terminate in a body of water in a tank or other reservoir, as shown at G in Fig. 1, and that the pipe D extends downward into a barrel or other reservoir of water, as shown at H, below the level of the reservoir G. Now, if by any means the air be exhausted from the tank A, or the latter filled with water, then the apparatus will act as a siphon, drawing the water from the upper reservoir through the pipe C and delivering it into the tank A, keeping the latter constantly full and the walls of the condensing-chamber S cool. The water flows constantly in contact with the walls of the chamber S and out at the bottom of the tank A through the pipe D into the lower reservoir, H, which it overflows. If now, by means of a pipe, E, communicating with the exhaust-port of a steam-engine, steam be allowed to enter the chamber S, it will instantly condense by contact with the walls of the said chamber and produce a vacuum therein, and the water of condensation will be constantly discharged through the pipe D' into the reservoir or hot-well H', from whence it may be taken to supply the boiler. As the water cannot fill the pipe D' to a greater height above the surface of the water in the reservoir H' than the atmospheric pressure can force it—say thirty-four feet—the tank A may be prevented from becoming full of water by placing it at a sufficient height above the reservoir H'.

The filling of the siphon to set the current of water in motion through the apparatus may be effected by pumping water into the tank, or by filling it with exhaust or other steam, and then waiting until the external cold air has condensed it. When once in operation, the water continues to flow until the supply is exhausted or the pipe closed.

To regulate the flow of water into the tank A, I propose to use an automatic valve or cock operated by a compound metallic rod or other thermal arrangement to open the valve when an excess of steam within the condensing-chamber S shall increase the temperature, and partially close it when the flow of water is greater than needful; or the flow may be regulated by a common stop-cock in either of the pipes C or D.

Having thus described my invention, what I claim as new therein, and desire to secure by Letters Patent, is—

1. The use, in connection with a steam-engine of any form, of an air-tight surface-condensing tank, S, surrounded wholly or in part by a water-chamber, A, and placed so high above the outlet of the exit-pipe that the condensed water will escape by its own gravity, substantially as explained.

2. The use of a siphon to convey condensing water to the water-chamber A of a surface-condensing tank thus placed.

3. A siphon having as a part of itself a surface-condensing tank, kept cold by the passage of water through the siphon, and kept from becoming full of water of condensation by its own elevation above the reservoir or hot-well H', substantially as set forth.

GEORGE I. WASHBURN.

Witnesses:
  T. SCHEITLIN,
  CHARLES SMITH.